United States Patent
Yerli

(10) Patent No.: US 9,104,333 B2
(45) Date of Patent: Aug. 11, 2015

(54) DYNAMIC ENHANCEMENT OF MEDIA EXPERIENCE

(71) Applicant: Gface GmbH, Frankfurt am Main (DE)

(72) Inventor: Cevat Yerli, Frankfurt am Main (DE)

(73) Assignee: Crytek GmbH, Frankfurt am Main (DE)

( * ) Notice: Subject to any disclaimer, the term of this patent is extended or adjusted under 35 U.S.C. 154(b) by 0 days.

(21) Appl. No.: 14/092,887

(22) Filed: Nov. 27, 2013

(65) Prior Publication Data

US 2015/0149669 A1    May 28, 2015

(51) Int. Cl.
   *G06F 3/00*    (2006.01)
   *G06F 3/06*    (2006.01)
   *G06F 13/10*   (2006.01)

(52) U.S. Cl.
   CPC ............ *G06F 3/0655* (2013.01); *G06F 3/0604* (2013.01); *G06F 3/067* (2013.01); *G06F 13/10* (2013.01)

(58) Field of Classification Search
   CPC ....................................................... G06F 3/067
   See application file for complete search history.

(56) References Cited

U.S. PATENT DOCUMENTS

| 2004/0034875 | A1 | 2/2004 | Bulkowski |
| 2006/0130120 | A1 | 6/2006 | Brandyberry |
| 2008/0165388 | A1 | 7/2008 | Serlet |
| 2013/0271655 | A1* | 10/2013 | Krahnstoever et al. ....... 348/500 |

FOREIGN PATENT DOCUMENTS

WO    2010112978 A1    10/2010

OTHER PUBLICATIONS

Extended European Search Report mailed Mar. 30, 2015, issued in corresponding European Application No. 14194950.3, filed Nov. 26, 2014, 7 pages.

* cited by examiner

*Primary Examiner* — Zachary K Huson
(74) *Attorney, Agent, or Firm* — Christensen O'Connor Johnson Kindness PLLC

(57) ABSTRACT

The present disclosure relates to a method for enhancement of media experience that comprises transmitting, by a first computing device, a data stream stored in a first storage region of the first computing device to an output device connected to the first computing device, providing, by a trigger module, a trigger that is linked to the data stream, detecting, by a detection module, the trigger while the data stream is being transmitted, and providing, by a content module, additional data in response to detecting the trigger. Furthermore, a system for enhancement of media experience is described.

15 Claims, 2 Drawing Sheets

DYNAMIC ENHANCEMENT OF MEDIA EXPERIENCE

FIELD

The present disclosure relates to a method and a system for enhancement of media experience.

BACKGROUND

For video platforms provided on the Internet, advertising follows a strict scheme. While a user watches a movie, in certain pre-determined time intervals, the movie is interrupted to show advertisements in the form of one or more clips. On an Internet video platform, several users can watch a movie at the same time. The same advertisement is shown to all users watching the movie without taking specific interests of the users into account.

Another scenario relates to watching a movie in a cinema. While a user watches the movie, some aspect of the movie might raise his interest, for example, a specific car or a town shown in the movie. However, the user has to wait until the movie is over to gain access to information about the aspect that has inspired his interest.

It is thus desirable to provide improved technologies to enhance the media experience of a user. In particular, it is desirable to take the interests of the user into account to provide media enhancement with added benefit for the user.

SUMMARY

In a first aspect, the present disclosure provides a method comprising the following steps: transmitting, by a first computing device, a data stream stored in a first storage region of the first computing device to an output device connected to the first computing device;

providing, by a trigger module, a trigger that is linked to the data stream;

detecting, by a detection module, the trigger while the data stream is being transmitted; and providing, by a content module, additional data in response to detecting the trigger.

In a second aspect, a system is provided, comprising:

a first computing device having a first storage region in which a data stream is stored, wherein the first computing device is configured to transmit the data stream to an output device connected to the first computing device;

a trigger module configured to provide a trigger linked to the data stream;

a detection module configured to detect the trigger while the data stream is being transmitted; and a content module configured to provide additional data in response to detecting the trigger.

The data stream can be considered as a sequence of digitally encoded coherent signals (data packets) used to transmit or receive information that is in the process of being transmitted. The data stream can comprise, for example, audio and/or video data. The data stream may be a linear content. Linear content progresses without any navigational control of a user consuming the data stream, e.g., a cinema presentation. For example, the data stream may be a linear multimedia content. Multimedia can include text, audio, still images, animation, or video content or a combination thereof.

The output device may be a display device, a projector device, and/or an audio device such as a speaker. The output device may be integrated in the first computing device or it may be separated from the first computing device. The first computing device and the output device may be connected by a wired connection or by a wireless connection. The additional data may be provided by transmitting it to the output device.

The trigger module may be configured to provide one or more triggers that are linked to the data stream. Several triggers may be provided for the data stream with equivalent distances in time to each other. In another embodiment, several triggers may have different time intervals.

The one or more triggers may be included in the data stream. In this case, on every occasion when the data stream is provided, the same trigger(s) are provided with the data stream. In an alternative, the one or more triggers may be provided independently from the data stream. This allows adapting the trigger(s) for each occasion when the data stream is provided.

The one or more triggers may be linked to content of the data stream. The one or more triggers may comprise metadata or may be linked to metadata of the data stream. For example, if the data stream is a movie shown in a cinema, the movie may comprise showing a specific car. The one or more triggers may be linked to the car so that for each appearance of the car in the movie, additional data to the car is provided by the content module.

In one embodiment, the additional data is another data stream. For the other data stream, the disclosure provided above with regard to the data stream also applies. The additional data may be an advertisement, provided, for example, in the form of a movie clip. The content module may be a metadata generator. The additional data can be created by the content module taking into account metadata provided by the trigger or to which the trigger is linked.

The content module may be implemented on a second computing device and the additional data may be stored in a second storage region of the second computing device. The first computing device and the second computing device may be connected with each other, for example, by a wired connection or by a wireless connection. The first computing device can be regarded as a content server providing the data stream, e.g., a movie. The second computing device can be regarded as an ad server (advertisement server) providing trigger-initiated advertisements. This leads to a dislocation of media (the data stream) and advertisements (the additional content). The first computing device and/or the second computing device may be part of a social network.

The trigger module and/or the detection may be implemented in the first computing device, in the second computing device, or in a third computing device, wherein the third computing device is connected to the first computing device and the second computing device by a wired connection or by a wireless connection.

The method may further comprise the steps of detecting a user device that is connected to the content module and transmitting the additional data to the user device. The user device may be logged in to the computing device on which the content module is implemented, e.g., the second computing device. The user device may be connected to the content module by a wired connection or a wireless connection. The user device may be a handheld device such as a mobile phone, a smartphone, or a tablet PC. The user device may comprise a display device and/or an audio device, e.g., a speaker.

The additional data may be personalized data for a user of the user device. The user may log in to the content module providing personal information and allowing the content module to identify the user. The content module may have access to a user profile of the user, for example, via a social network. The content module may be configured to select additional data taking into account information provided in the user profile. For example, if the user profile comprises information about specific interests of the user, the content module may select and provide additional information related to the specific interests of the user. Further, a downloadable content can be personalized.

The disclosure refers to the usage of a first computing device, a second computing device, and a third computing device. Each computing device may comprise one or more processors configured to execute instructions. Further, each computing device may comprise a memory in the form of volatile memory (e.g., RAM—random access memory) and/or non-volatile memory (e.g., a magnetic hard disk or a flash memory). Each computing device may further comprise means for connecting and/or communicating with other computing devices, for example, by a wired connection (e.g., LAN—local area network, Firewire (IEEE 1394) and/or USB—universal serial bus) or by a wireless connection (e.g., WLAN—wireless local area network, Bluetooth, and/or WiMAX—Worldwide Interoperability for Microwave Access). Each computing device may comprise a device for registering user input, for example, a keyboard, a mouse, and/or a touch pad. Each computing device may comprise a display device. Alternatively, each computing device may be connected to a display device. The display device may be a touch-sensitive display device (e.g., a touch screen). The user device may also comprise one or several (e.g., all) of the above mentioned features.

The features disclosed in connection with the method may be applied to the system as well and vice versa.

DESCRIPTION OF THE DRAWINGS

The specific features, aspects, and advantages of the present disclosure will be better understood with regard to the following description and accompanying drawings where.

DETAILED DESCRIPTION

In the following description of exemplary embodiments, reference is made to the drawings that show by way of illustration specific embodiments. It is to be understood that the embodiments may include changes in design and structure without departing from the scope of the present invention as defined in the claims Like reference signs are used for the same components.

Figure 1:
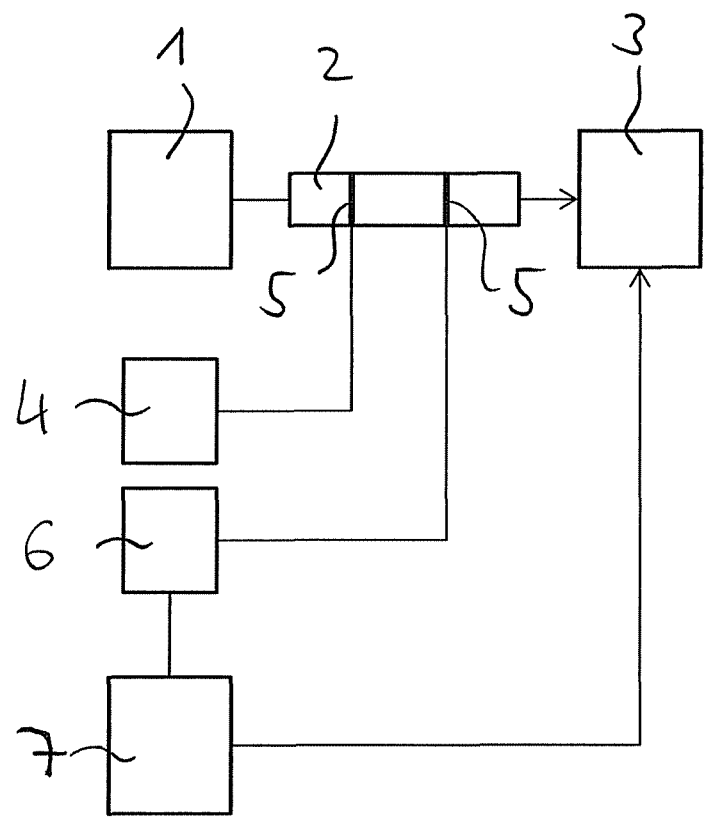
FIG. 1 shows a schematic presentation of a system.

In FIG. 1, a schematic presentation of one embodiment of a system is shown. In a first computing device 1, a data stream 2 is stored in a memory (not shown). The data stream 2 is transmitted by the first computing device 1 to an output device 3. The first computing device 1 may be a content server that can be integrated in a social network. The data stream 2 can comprise audio and/or video content. The output device 3 can be a display device, such as a touch screen or a monitor, a projector device, such as a movie projector in a cinema, or an audio device, such as a speaker or a woofer. The output device 3 can also combine the before-mentioned components, e.g., being a display device with a speaker.

A trigger module 4 provides one or more triggers 5 which are linked to the data stream 2. The trigger(s) 5 can also be included in the data stream 2. The trigger(s) 5 can further be linked to content of the data stream 2.

The trigger 5 is detected by a detection module 6 which is connected to a second computing device 7 in which a content module is implemented. The second computing device comprises memory (not shown) in which additional data is stored. Upon detection of the trigger 5, the additional data is transmitted by the second computing device 7 to the output device 3. The additional data can be another data stream, e.g., comprising audio and/or video content. For example, the additional data can be an advertisement, e.g., in the form of a movie clip. By transmitting the additional data to the output device 3, a media experience of a user may be enhanced.

Figure 2:
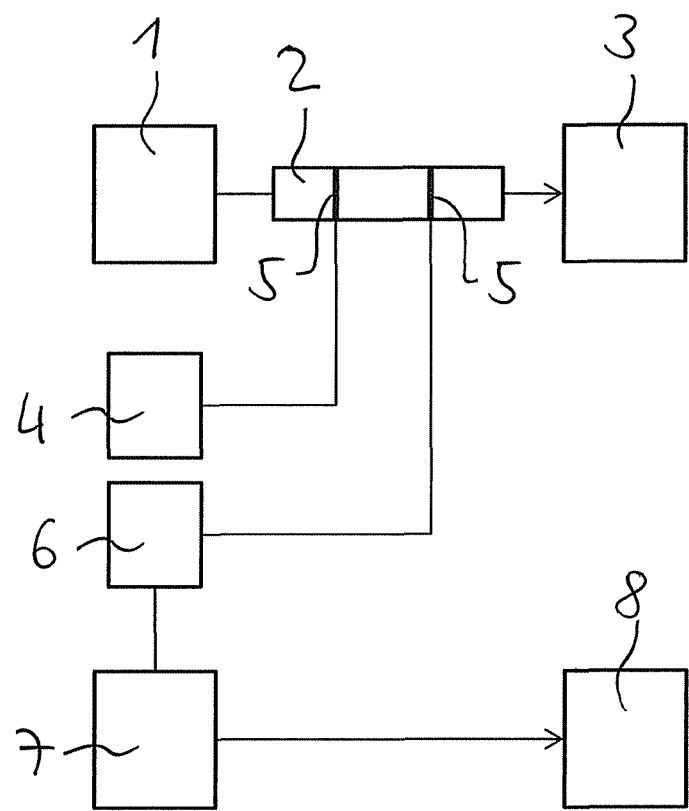
FIG. 2 shows a schematic presentation of another system.

FIG. 2 shows another embodiment of a system. Upon detection of the trigger 5 by the detection module 6, additional data is transmitted, by the second computing device 7, to a user device 8. The user device 8 can be a handheld device, e.g., a mobile phone, a smartphone, or a tablet PC. The user device 8 can be logged in to a social network. By accessing a user profile, personalized additional data can be provided by the content module. For example, the content module can be a metadata generator. Taking metadata and/or personal information into account, user-specific additional data can be generated by the metadata generator.

In at least one embodiment, a user may visit a cinema to watch a movie. The movie can be transmitted from the first computing device 1 to a movie projector that projects the movie on a screen of the cinema. If a specific car is shown in the movie, information about the car can be displayed on the screen. Displaying information is started by the trigger 5 in the movie. The information is transmitted by the second computing device 7. Alternatively, information (in form of additional data) can be provided to the user that a video game that is related to the movie is available. In another embodiment, while the user is still waiting in the cinema watching trailers before the main movie starts, information can be provided that certain products sold in the cinema, e.g., popcorn, ice cream or soft drinks, that are sold for a reduced price for a short period.

In an alternative to projecting the additional information on the screen of the cinema, the additional information can be displayed on a mobile phone or smartphone of the user. The user may log in to a computing device of the cinema or a social network in which the cinema is present. By selecting the movie to be watched by the user, specific triggers can be provided to transmit additional information to the user device. Personalized information can further comprise a story extension to the movie or an incentive to buy something.

Although embodiments of the present invention have been described in detail, it is to be understood that various changes, substitutions, and alterations can be made hereto without departing from the spirit and the scope of the invention as defined in the appended claims.

The invention claimed is:

1. A method comprising the following steps:
    transmitting, by a first computing device, a data stream stored in a first storage region of the first computing device to an output device connected to the first computing device;
    providing, by a trigger module, a trigger which is linked to the data stream;
    detecting, by a detection module, the trigger while the data stream is being transmitted; and
    providing, by a content module, additional data in response to detecting the trigger.

2. The method of claim 1, wherein the data stream is a linear content.

3. The method of claim 1, wherein the trigger is included in the data stream.

4. The method of claim 1, wherein the trigger is linked to content of the data stream.

5. The method of claim 1, wherein the content module is a metadata generator.

6. The method of claim 1, wherein the additional data is another data stream.

7. The method of claim 1, wherein the content module is implemented on a second computing device and the additional data is stored in a second storage region of the second computing device.

8. The method of claim 7, wherein the first computing device and the second computing device are connected with each other.

9. The method of claim 1, further comprising the steps of:
detecting a user device which is connected to the content module; and
transmitting the additional data to the user device.

10. The method of claim 9, wherein the additional data is personalized data for a user of the user device.

11. A system comprising:
a first computing device having a first storage region in which a data stream is stored, wherein the first computing device is configured to transmit the data stream to an output device connected to the first computing device;
a trigger module configured to provide a trigger linked to the data stream;
a detection module configured to detect the trigger while the data stream is being transmitted; and
a content module configured to provide additional data in response to detecting the trigger.

12. The system of claim 11, wherein the content module is implemented in a second computing device and the additional data is stored in a second storage region of the second computing device.

13. The system of claim 12, wherein the first computing device and the second computing device are connected with each other.

14. The system of claim 11, wherein the content module is a metadata generator.

15. The system of claim 11, further comprising a user device which is connected to the content module, wherein the content module is configured to provide the additional data to the user device.

* * * * *